June 23, 1936.   H. E. TAUTZ   2,045,422
SHAPER
Filed Nov. 25, 1935
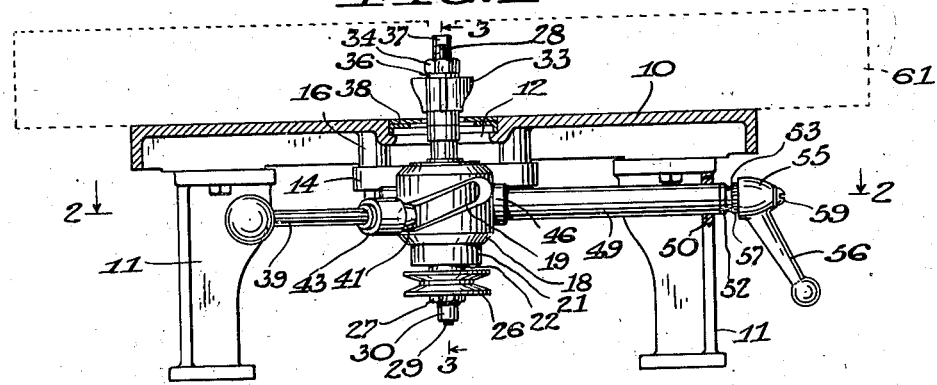
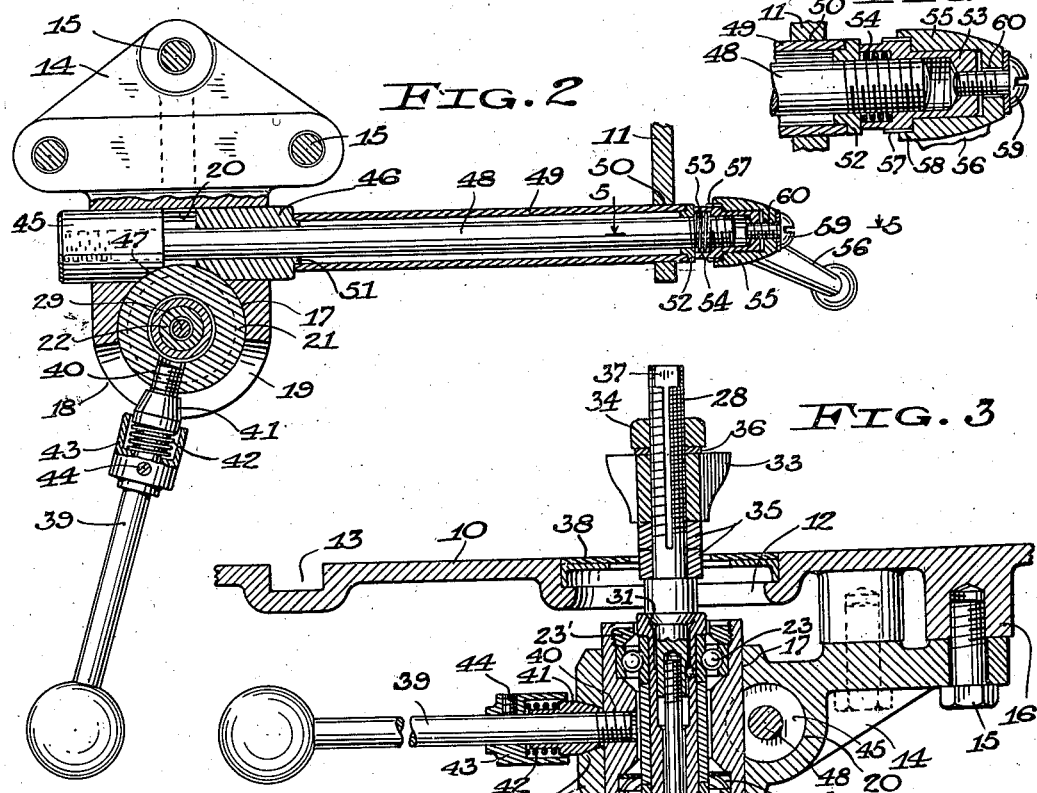
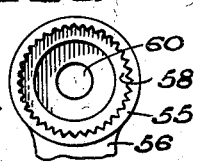
WITNESSES
L. E. Kilian
C. L. Naal
INVENTOR
Herbert E. Tautz
By R. S. Caldwell
ATTORNEY Patented June 23, 1936

2,045,422

UNITED STATES PATENT OFFICE 2,045,422

SHAPER

Herbert E. Tautz, Milwaukee, Wis., assignor to The Delta Manufacturing Company, Milwaukee, Wis., a corporation of Wisconsin Application November 25, 1935, Serial No. 51,341

10 Claims. (Cl. 144—134)

The invention relates to wood-working machines and more particularly to spindle shapers.

An object of the invention is to provide a spindle shaper having improved and easily manipulated means for adjustably positioning the rotary cutter thereof with respect to the table.

Another object of the invention is to provide a spindle shaper having improved means for preventing axial shifting of the cutter from its adjusted position.

A further object is to provide a shaper spindle mounting which will permit smooth and accurate high speed operation and which will facilitate the attachment of cutters of different sizes.

The invention further consists in the several features hereinafter described and claimed.

In the accompanying drawing, illustrating a specific embodiment of the invention, Fig. 1 is a sectional elevation of a spindle shaper constructed in accordance with the invention;

Fig. 2 is a sectional view taken generally along the line 2—2 of Fig. 1;

Fig. 3 is a sectional view taken generally along the line 3—3 of Fig. 1;

Fig. 4 is a detail view of an adjusting handle, and

Fig. 5 is a detail sectional view taken along the line 5—5 of Fig. 2.

In the drawing, 10 designates a shaper table provided with legs 11 and having a rabbeted spindle opening 12 and a gage-guiding groove 13. A bracket or housing 14 is rigidly secured by screws 15 to bosses 16 on the underside of the table, and has a vertical bore 17 in alignment with the table opening 12, the axis of the bore being perpendicular to the table top. The bracket or housing 14 has an arcuate wall portion 18 concentric with the bore 17 and provided with a pair of cam surfaces, preferably formed by the opposite sides of a helical slot 19. In the case of a helical slot, the opposite sides thereof are convergent in cross-section, preferably inwardly. A horizontal or transverse bore 20 is formed in the bracket 14 and partially intercepts the vertical bore 17, the bore 20 being at the side of the bore 17 distant from the helical slot 19. The bracket or housing 14 is preferably a separate member, as shown, but it will be obvious that it may be integral with the table, if desired. When the bracket or housing is secured to the table it forms, in effect, a part of the table.

A bearing member, here shown in the form of a sleeve or quill 21, slidably fits in the vertical bore 17 and is vertically adjusted and clamped therein by means hereinafter described. A hollow spindle member 22 passes through the sleeve 21 and is journalled therein on ball bearings 23 and 24 mounted in opposite end portions of the sleeve, the intermediate portion of the sleeve being relatively thick to resist deformation. The outer race of the upper bearing 23 is secured in place by a slotted spanner nut 23', and the upper portion of the spindle member 22 is shouldered to engage the inner race. The bearings are preferably preloaded, as by a spring 25 engaging the lower bearing 24, so as to avoid axial play of the spindle member in the sleeve and to prevent vibration. A pulley 26 is keyed to the lower end of the hollow spindle member 16 and is clamped thereon by a nut 27, thereby also securing the inner bearing races on the spindle member.

A shouldered auxiliary spindle member 28 has its lower portion snugly fitting in, and keyed to, the upper end of the hollow spindle member 22 and secured thereto by a stud 29 which is threaded into the lower end of the auxiliary spindle member and is clamped by a nut 30 engaging the lower end of the hollow spindle member. Preferably the auxiliary spindle member 28 and the nut 30 have conically formed portions engageable with conical seats 31 and 32 at the opposite ends of the hollow spindle member 22 to accurately center the auxiliary spindle member with respect to the hollow spindle member. The auxiliary spindle member projects upwardly through the table opening 12 and detachably receives thereon a suitable cutter 33 clamped thereto by a nut 34 which is threaded on the spindle member, there also being spacing collars 35 and a washer 36 on the spindle member. The upper end of the auxiliary spindle member has a flattened wrench-receiving part 37. The cutting lips of the cutter are so shaped as to impart a desired configuration to the wood. The cutter shown may be replaced by one or more other cutters with cutting lips of different shape. A cutter having a bore of different size may be used by replacing the auxiliary spindle member 28 with another having an upper portion of suitable diameter. The rabbeted table opening 12 is preferably provided with a removable insert 28 through which the auxiliary spindle member extends. The two spindle members 22 and 28 when assembled form the spindle of the shaper.

A handle forming rod 39 passes through the helical slot 19 of the bracket 14 and is screw-threaded into an opening 40 formed in the thick intermediate part of the sleeve or quill 21. A guide member 41 slidably fits on the rod 39 and has a tapered end portion extending into the helical slot 19 and frictionally engaging the converging walls of the slot. By way of illustration, the guide member is here shown to be a sleeve with a conically formed end which fits into the helical slot. The other end of the sleeve-like guide member is reduced in diameter and is surrounded by a compressed coiled spring 42 enclosed by a cup-shaped retainer collar 43 adjustably secured to the rod 39 by a set screw 44. The spring wedges the guide member into the helical slot so as to prevent backlash.

With a sufficient pressure on the coiled spring 42, the guide member 41 engaging in the helical slot 19 will hold the sleeve 21 against displacement from its adjusted position. Preferably, however, additional means are provided to firmly clamp the sleeve in its adjusted position. A pair of clamping members 45 and 46 slidably fit in the bore 20 and each has a concave clamping surface 47 fitting against the cylindrical surface of the sleeve, such engagement also preventing rotation of the clamping members. A rod 48 is rigidly secured to the clamping member 45 and slidably passes through the clamping member 46. A spacer sleeve 49 surrounds the rod and at its outer portion passes through an opening 50 formed in one of the table legs 11. If desired, the spacer sleeve may be additionally supported by the walls of this opening. At its inner end the sleeve 49 fits over a centering embossment 51 on the clamping member 46, and at its outer end the sleeve fits onto a shouldered centering washer 52 surrounding the rod. At its outer end the rod is screw-threaded into a nut-forming thimble 53 in which a compressed coil spring 54 is housed to press against the washer 52, thus spring-urging the clamping members 45 and 46 together into frictional engagement with the sleeve 21. The thimble 53 fits into the cup shaped hub 55 of a handle 56 and is adjustably locked thereto by peripheral serrations 57 on the thimble interengaging with serrations 58 formed in the handle hub. The handle is secured to the thimble by a screw 59 passing through an opening 60 in the handle hub and threaded into the end of the thimble. In effect, the spacer sleeve 49 forms an extension of the clamping member 46, and the screw-threaded thimble 53 forms an actuating cam.

In assembling the shaper, the bracket or housing 14 and the various parts mounted thereon, including the spindle and the spindle adjusting and clamping means, form a unit which is attached to the shaper table by the screws 15, the handle 56 being temporarily removed to permit insertion of the spacer sleeve 49 through the opening 50 in the table leg, in cases where such opening is provided. This spindle unit is capable of use on various shaper tables.

In setting up the machine for use an auxiliary spindle member 28 of suitable size is secured to the hollow spindle 22, and the desired cutter or cutters are mounted on the auxiliary spindle member.

In operation, the projection of the cutter above the table is finely adjusted by swinging the rod 39, which causes the guide member 41 to slide along the helical slot 19 and by its cam action with the sides of the slot to axially shift the sleeve 21, the wedging fit of the spring-pressed guide member in the helical slot avoiding backlash. When the desired cutter elevation is reached, the rod 41 is released and remains in its adjusted position by the frictional wedging engagement of the guide member 41 with the inwardly converging walls of the helical slot. The same engagement also prevents axial shifting of the sleeve 21 from its adjusted position. The sleeve 21 is then locked firmly in position by turning the handle 56 which causes the clamping members 45 and 46 to tightly engage the sleeve 21 at its thick intermediate portion, there being no danger of distorting the bearing races. The clamping of the sleeve 21 will not disturb the perpendicular relation of the sleeve and spindle to the top surface of the table. The wood to be shaped is passed over the table and into engagement with the rotating cutter, the wood being guided by a fence 61 or other suitable guiding means. The cutter remains in its accurately adjusted position and is capable of high speed operation without vibration.

While the invention is here shown to be embodied in a spindle shaper, it is also applicable to other machines.

What I claim as new and desire to secure by Letters Patent is:

1. In combination, a table having an opening, a support secured to said table and having a bore in register with said opening, said support having an arcuate wall portion concentric with said bore and provided with a substantially helical slot the opposite sides of which are convergent in cross-section, a sleeve axially slidable and angularly displaceable in said bore, a cutter-carrying spindle rotatably supported by said sleeve and projecting through said table opening, a rod passing through said slot and secured to said sleeve, and a spring-urged member on said rod having a slidable wedging engagement with the opposite sides of said slot, said rod being swingable in said helical slot to axially shift said sleeve and spindle.

2. In combination, a table member having a bore and an arcuate wall portion concentric with said bore, said wall portion having a substantially helical slot the opposite sides of which are convergent in cross-section, a bearing member axially slidable and angularly displaceable in said bore, a cutter-carrying spindle rotatably carried by said bearing member, and a spring-urged guide member carried by said bearing member and having a slidable wedging engagement with the opposite sides of said helical slot to axially shift said bearing member and spindle when said bearing member is turned in said support.

3. In combination, a table member having a bore and an arcuate wall portion concentric with said bore, said wall portion having a substantially helical slot the opposite sides of which are convergent inwardly, a bearing member axially slidable and angularly displaceable in said bore, a cutter-carrying spindle rotatably supported by said bearing member, a handle-forming rod passing through said slot and secured to said bearing member, and an inwardly spring-urged guide member slidable on said rod and having a slidable wedging engagement with the opposite sides of said slot, said rod being swingable in said helical slot to axially shift said bearing member and spindle.

4. In a spindle shaper, the combination of a table member having a bore perpendicular to the table top and an arcuate portion about said bore, a bearing member slidably and rotatably fitting in said bore and movable relatively toward and away from the table top, a spindle rotatably carried by said bearing member, a cutter carried by said spindle, said arcuate portion of the table member having a helically extending cam surface, a guide member carried by said bearing member and slidable along said cam surface to relatively shift said spindle-carrying bearing member with respect to said table member for adjustably positioning the cutter with respect to the table top, and resilient means for holding said guide member in engagement with said cam surface.

5. In combination, a table member having a bore and an opening extending transversely of said bore, a bearing member axially slidable in said bore, a cutter-carrying spindle rotatably supported by said bearing member, means for axially shifting said bearing member in said bore, a pair of aligned clamping members slidable in said opening and engageable with the outer surface of said bearing member, spring means for urging said clamping members toward each other into frictional engagement with said bearing member, and actuating means for urging said clamping members toward each other into clamping engagement with said bearing member, said spring means and actuating means acting in the same direction.

6. A spindle mounting unit for a shaper table, comprising a supporting member adapted to be secured to the table and having a bore, there being an arcuate wall portion about said bore having a helically formed cam surface, a bearing member rotatable and axially slidable in said bore, a cutter spindle rotatably supported by said bearing member, a guide member carried by said bearing member and slidably engaging said cam surface to shift said bearing member axially when said guide member is moved along said cam surface, and resilient means for holding said guide member in engagement with said cam surface.

7. A spindle mounting comprising a supporting member having a bore and a wall portion about said bore, said wall portion having a helically formed cam surface, a bearing member rotatable and axially slidable in said bore, a spindle rotatably supported by said bearing member, a guide member carried by said bearing member and slidably engaging said cam surface to shift said bearing member axially when said guide member is moved along said cam surface, and resilient means for holding said guide member in engagement with said cam surface.

8. A spindle mounting comprising a supporting member having a bore and a wall portion about said bore, said wall portion having a helically formed cam slot with opposite sides convergent in cross-section, a bearing member rotatable and axially slidable in said bore, a spindle rotatably supported by said bearing member, a guide member carried by said bearing member and slidably engaging the sides of said helical slot to shift said bearing member axially when said guide member is moved along said slot, and resilient means for holding said guide member in wedging engagement with the opposite sides of said slot.

9. In combination, a table member having a bore, a bearing member slidably fitting in said bore for relative axial and angular movement with respect to said table member, a cutter spindle rotatably carried by said bearing member, one of said members having a helically extending cam surface, a guide carried by the other member and having a slidable engagement with said cam surface to effect relative axial shifting of said members by relative rotation of said members, and resilient means for holding said guide in engagement with said cam surface.

10. In combination, a table member having a bore, a bearing member slidably fitting in said bore for relative axial and angular movement with respect to said table member, a cutter spindle rotatably carried by said bearing member, one of said members having a substantially helical slot the opposite sides of which are convergent in cross-section, a spring-urged guide carried by the other member and having a slidable wedging engagement with the opposite sides of said helical slot to effect relative axial shifting of said members by relative rotation of said members.

HERBERT E. TAUTZ.